Nov. 28, 1967  H. W. MITCHELL ET AL  3,355,733

DESIGNATED AREA INSTRUMENT LANDING SYSTEM

Filed Oct. 19, 1964                    6 Sheets-Sheet 1

INVENTOR.
HARRY W. MITCHELL
MILFORD R. MURPHY
BY Kenyon & Kenyon
ATTORNEYS

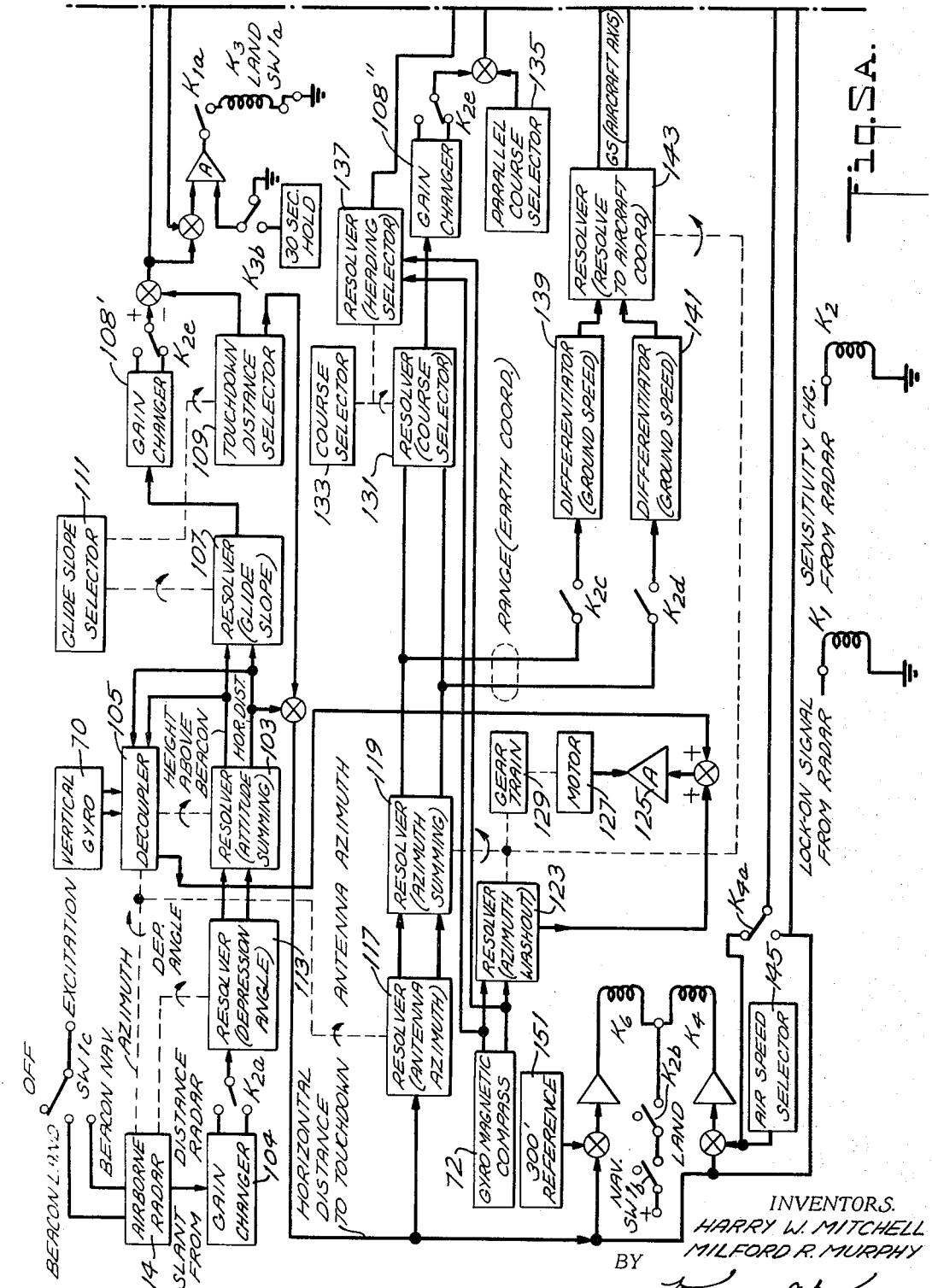

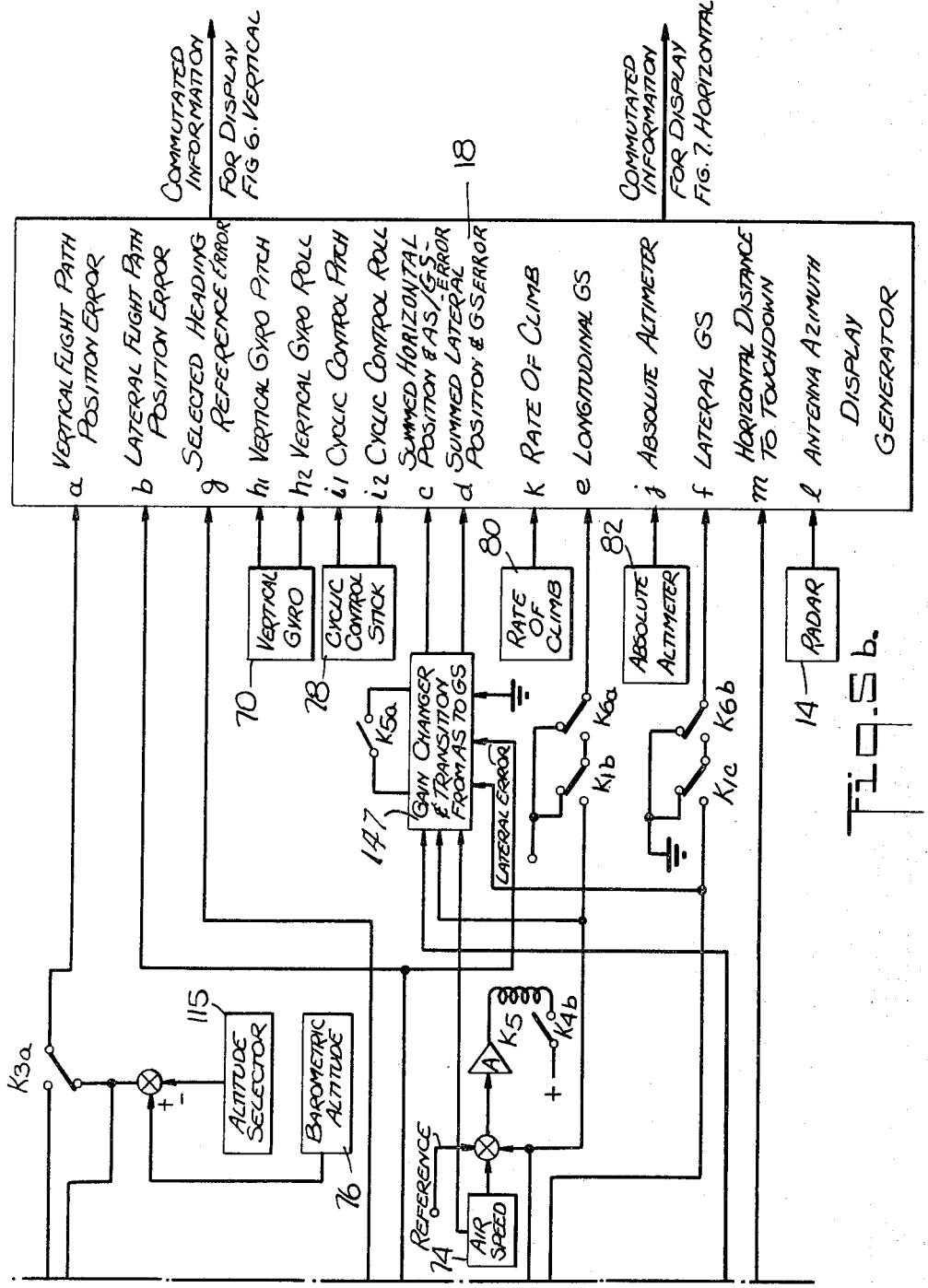

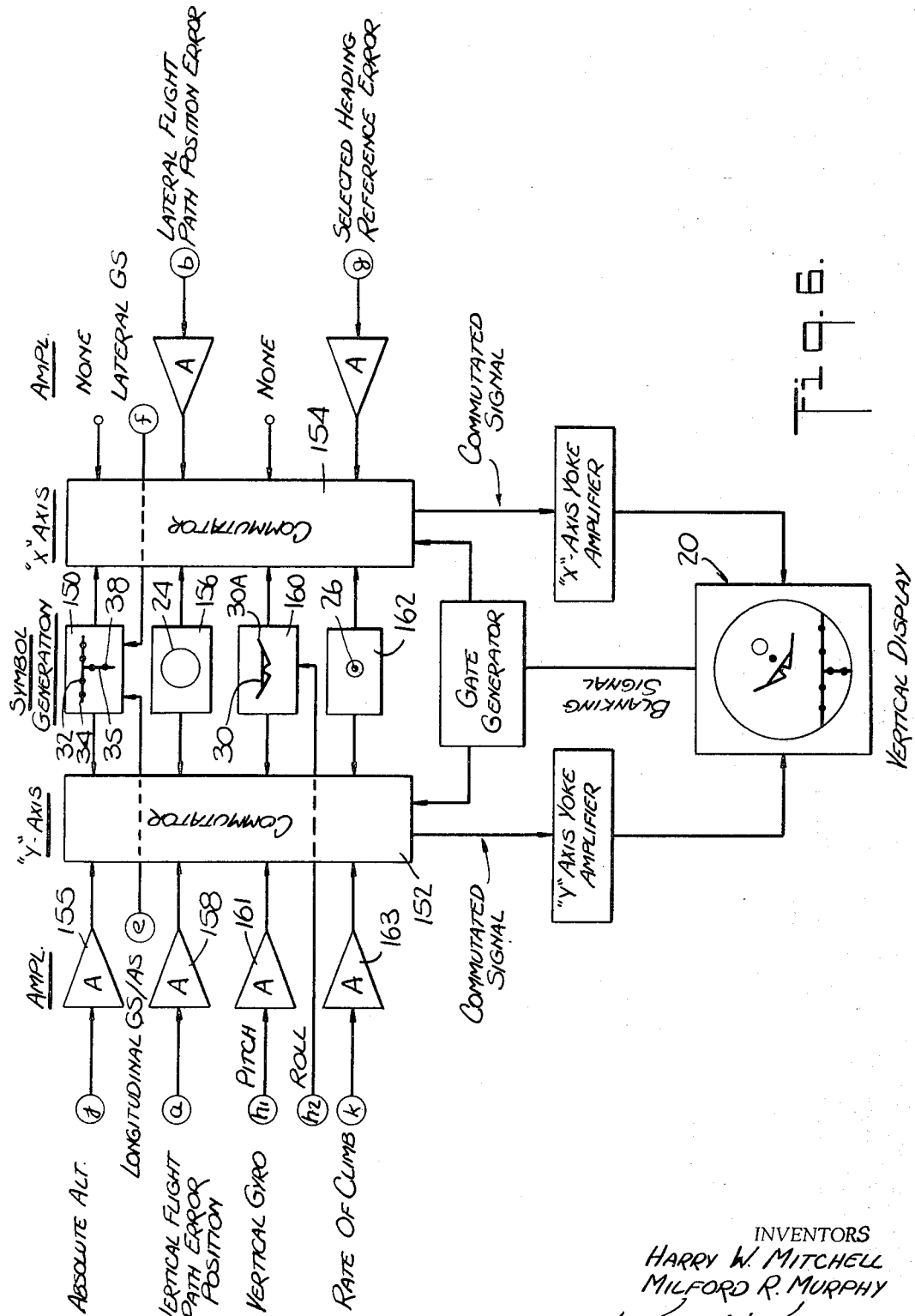

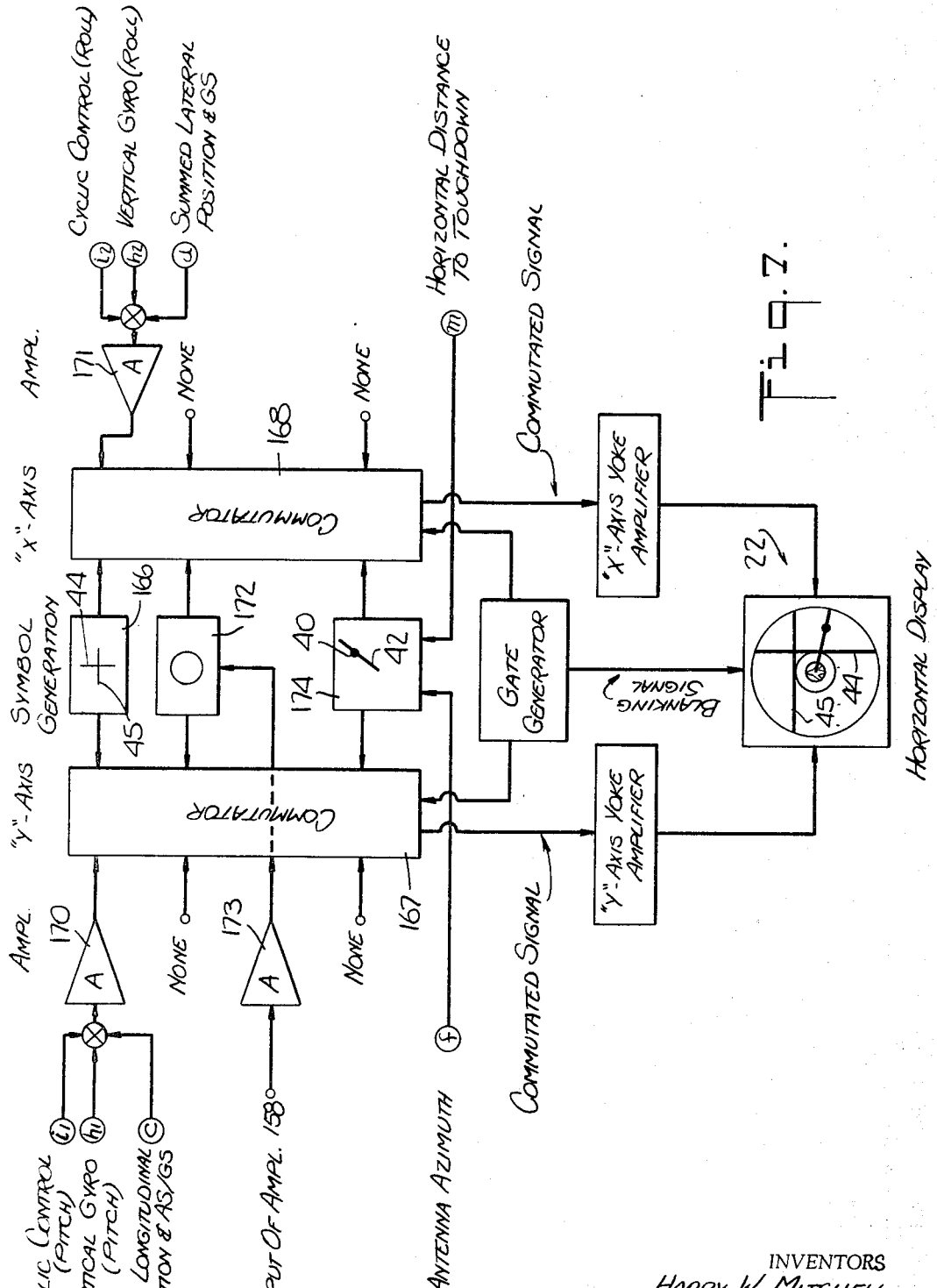

United States Patent Office 3,355,733
Patented Nov. 28, 1967

3,355,733
DESIGNATED AREA INSTRUMENT LANDING SYSTEM
Harry W. Mitchell, Hurst, and Milford R. Murphy, Arlington, Tex., assignors to Bell Aerospace Corporation, Wheatfield, N.Y., a corporation of Delaware
Filed Oct. 19, 1964, Ser. No. 404,728
11 Claims. (Cl. 343—7.9)

This is a continuation-in-part of application Serial No. 117,716, filed June 16, 1961, now abandoned.

The present invention relates to a remote area instrument landing system of the type wherein the operator of a vehicle approaching an unprepared designated area may be informed both as to the horizontal and vertical dynamic position of his vehicle with respect to the area.

Numerous aircraft instrument landing systems have been heretofore devised. Two basic types are in relatively extensive use. One of these types is commonly known as ILS (Instrument Landing System) in which a localizer transmitter and a glide-slope transmitter are positioned in the landing area to develop a landing path extending into space for aircraft sensors to detect and to provide information as to the actual deviation of the aircraft from this prescribed path. No velocity or distance control is usually provided with these systems and the information is not satisfactory for blind landings. The other type is referred to as GCA (Ground Control Approach) in which a ground radar tracking station determines and displays aircraft position to a ground operator who instructs the pilot as to desired change of position. In operation, both of the above systems only provide approach guidance information and hence the touchdown must be made under visual conditions.

A third type of instrument landing system, presently under limited use on aircraft carriers, is similar to GCA with the additional feature of telemetering the tracking information and the positional deviation from a selected path back to a display system in the subject aircraft. In a more elaborate form this tracking or deviation information is applied to the aircraft automatic control to touchdown. Also, none of the above systems have been designed to provide the positional and ground speed measurement accuracies required for blind landings of VTOL aircraft.

The present invention contributes an instrument landing system with capabilities extending beyond those existing and known, wherein a pilot is able, with respect to a designated landing area, to select a landing path from any point within a predetermined radius and guide his approach with respect to this selected path as instructed by a display system indicating velocity control and deviation from a path down to and including the act of touchdown. No restriction is imposed on the pilot of the type that requires him to relate his descent to a predetermined path.

The Designated Area Instrument Landing System (DIALS) is a *portable type* Instrument Landing System specifically designed for a designated area operation of aircraft or surface craft, as the case may be. This system has been made portable by installing the heavier type equipment in the moving vehicles and the light weight equipment on the ground, or in any other desired location for a position reference. Basic RAILS airborne equipment consists of a tracking radar, computer, display equipment, and master control box; the ground equipment consists of a transponder beacon. The airborne system requires inputs from the following conventional sensors which are not considered basic equipment: Barometric altitude, airspeed, attitude, heading, and absolute altitude. Absolute altitude is used for terrain avoidance and "peace of mind" information and is highly desirable information though not an absolute necessity. Complementary operation of the airborne system and the reference beacon furnishes the pilot of the vehicle the capability of selecting a particular reference beacon, which has been purposely located to accommodate the specific mission requirements, and to navigate and/or land in accordance to the selected flight path parameters: track, altitude or glide-slope, speed and touchdown spot.

As a result of the unique information display made possible according to the present invention, the pilot of the vehicle is presented with both a horizontal or plan dynamic view and a vertical sectional dynamic view of his aircraft with respect to a designated area beacon and the selected flight path.

Accordingly, it is an object of this invention to provide a designated area instrument landing system wherein the operator of a vehicle approaching said area is apprised dynamically of both his horizontal and vertical position with respect to said area.

Another object of this invention is to provide a designated area instrument landing system wherein a man-portable, battery powered ground beacon is employed with complementary airborne tracking, computing, sensing and display equipment.

Another object of this invention is to provide a landing system for aircraft approaching unprepared remote areas under instrument conditions.

Another object of this invention is to provide an operator of a vehicle approaching a designated area a coordinated and central display of the horizontal and vertical dynamic position of said vehicle with respect to said beacon and a preselected flight path.

Another object of this invention is to provide a method for displaying dynamic information relating to both the horizontal position and the vertical position of a vehicle with respect to a ground beacon and a predetermined flight path.

Another object of this invention is to provide an instrument landing system for aircraft wherein the change of velocity of the aircraft is programmed with vertical and horizontal position information.

Yet additional objects of the invention will become apparent from the ensuing specification and attached drawings wherein:

FIGS. 5a and 5b are a schematic and block diagram of the computer design to convert the sensor outputs into signals adapted for scope display; FIG. 5b circuitry being an extension of the circuitry shown in FIG. 5a;

FIG. 6 is a block diagram of the display generator equipment employed to provide the FIG. 2 display from the computer outputs; and FIG. 7 is a block diagram of the display generator equipment employed to provide the FIG. 3 display from the computer outputs.

Description of system components

Figure 1:
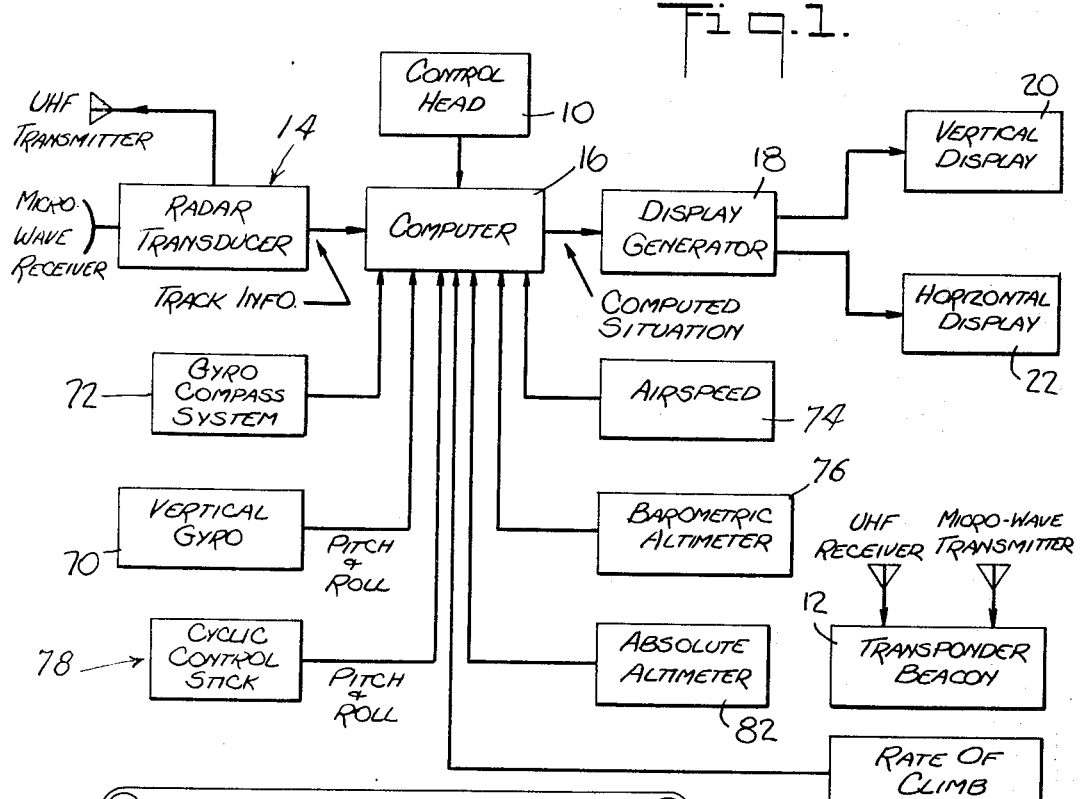
FIG. 1 is a block diagram of the present system showing tracking, master control, computer, sensor and display components of the present system with respect to an isolated transponder ground beacon.

With reference to FIG. 1, the control head 10 provides for flight mode and parameter selection. Accordingly, the pilot is provided with the capability of selecting either magnetic navigation, beacon landing (take-off) mode, beacon navigation mode or of selecting the outputs of any conventional navigational or landing system furnishing information in rectangular or polar coordinates.

Selection of magnetic navigation mode operates appropriate relays and associated circuitry that connects the output of the following sensors into the computer: heading, airspeed and barometric altitude. The purpose of magnetic navigation mode is to furnish a means of "dead-reckoning" navigation from one beacon area to another beacon area and to provide a "back-up" navigation system.

Selection of beacon landing mode prepares the circuitry so that the pilot can select the following flight parameters (which then provide control signals which the pilot can fly by viewing the presentation system): a particular beacon, altitude, course (desired radial to the reference beacon), glide-slope angle, airspeed (or groundspeed), and a desired landing location from the beacon and on a selected radial. During the beacon landing mode the altitude of the aircraft is controlled in accordance with the selected altitude until the glide-slope is intersected. The selection of beacon landing mode has prepared the signal processing circuitry such that at the point of intersection the altitude error circuitry is automatically switched to glide-slope error. Also, the airspeed of the aircraft is controlled in accordance with the selected airspeed until the start of automatic programming of airspeed, which is a function of the selected airspeed and the distance to the landing spot. Selection of beacon landing mode also prepares the signal processing circuitry such that pertinent error measuring circuitry is transitioned from airspeed to groundspeed in preparation for touchdown. The transition function also changes the gain ratios to accommodate landing requirements.

Selection of beacon navigation mode prepares the circuitry so that the pilot can select the following flight parameters: a particular beacon, airspeed (or groundspeed), barometric altitude, course (reference to magnetic north and the reference beacon), and lateral off-set. The selection of beacon navigation mode also connects the outputs of the appropriate sensors to the computer so that the pilot can fly the selected flight parameters by viewing the display system. The purpose of beacon navigation mode is for short range navigation and/or long range navigation, if the beacons are located for a "path-finder" type of mission.

In a particular system, according to the present invention, the below described components have been employed. The reference beacon 12 furnishes a reference location in the designated area. The battery-powered beacon 12 complements the airborne equipment to provide an instrument navigation and/or landing system for operation in any area. To conserve power, the beacon 12 remains in a standby mode after power has been applied and until it has been interrogated by the airborne unit. The interrogating signal of the airborne unit may be a code for a particular beacon 12 to the extent that one of several beacons in an operating area can be selected as reference. After an adequate number of interrogations by the airborne unit confirms the presence of an interrogating signal, power is automatically applied to the beacon 12 transmitter and the beacon 12 starts replying to the respective interrogations, having the capability of simultaneously accommodating a number of interrogation units. If the interrogating signal is lost for a prescribed length of time, the beacon 12 is automatically switched back to a standby mode to conserve battery life. It should be noted that the standby features promotes operational security and is very advantageous when beacons are located for "path-finder" type missions.

The tracking radar 14 activates a particular reference beacon 12 and tracks this beacon 12 in relative direction and distance. The airborne unit has two modes of operation: search and track. After a particular beacon 12 has been selected and the airborne system turned on, a microwave receiver portion of the radar 14 or the like search system starts searching in azimuth and elevation and the interrogating transmitter portion of the radar 14 starts transmitting a coded signal. The beacon 12 starts replying after the confirmation and warm-up period, provided the interrogating transmitter and beacon 12 are within a communicating range. The airborne unit uses the beacon replies for tracking in "direction to" and correlates the interrogating signal with the respective reply to determine "distance to." The microwave antenna system has the capability of continuous track in azimuth and will track from a plus 15 (+15) degrees to a minus sixty-five (−65) degrees in elevation. The ranging system will operate from a minimum of twenty (20) feet from the beacon to a maximum of ten (10) miles, or as required. The tracking radar 14 has three outputs which are fed into the computer 16. The three outputs, which are in aircraft coordinates, are: azimuth, depression angle, and slant distance to beacon.

The computer 16 accepts the tracking radar 14 output signals, "operates on" and processes these signals to satisfy the selected navigation and/or landing requirements of the system. The computer is the heart of the system. This unit accepts, "operates on," and processes the flight information, in accordance with the selected conditions from Master Control 10 and passes this information on to the display generator 18 which, in turn, conveys the information to the pilot via the presentation system (the vertical display 20 and horizontal display 22). Much of the output information from the computer 16 is in the form of error signals that have been developed as a function of the selected parameters and actual conditions, i.e., relative position, heading, airspeed, etc. These error signals represent deviation from the desired flight path.

The display generator 18 generates and drives flight symbols in accordance with the information furnished by the computer 16. The display generator 18 has the function of generating symbols with form factors that have a meaningful, physical significance with the respective sources of intelligence being analogized and also of driving the symbols at the proper gains and/or gain ratios. The display generator 18 includes a commutator to time-share the information channels if single gun cathode ray tubes are used for the presentation system 20, 22.

Figure 2:
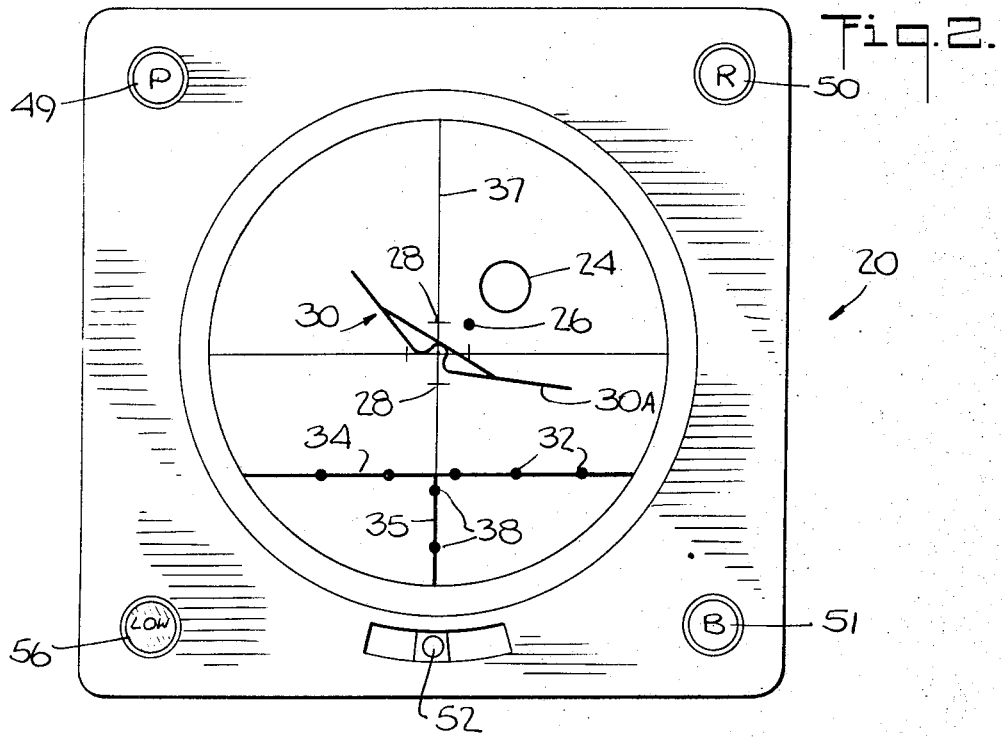
FIG. 2 is a front elevation of the vertical display component of the present system wherein are presented a vertical cross-sectional view of the position of a vehicle with respect to a desired flight path and lateral, as well as fore and aft control information.
Figure 3:
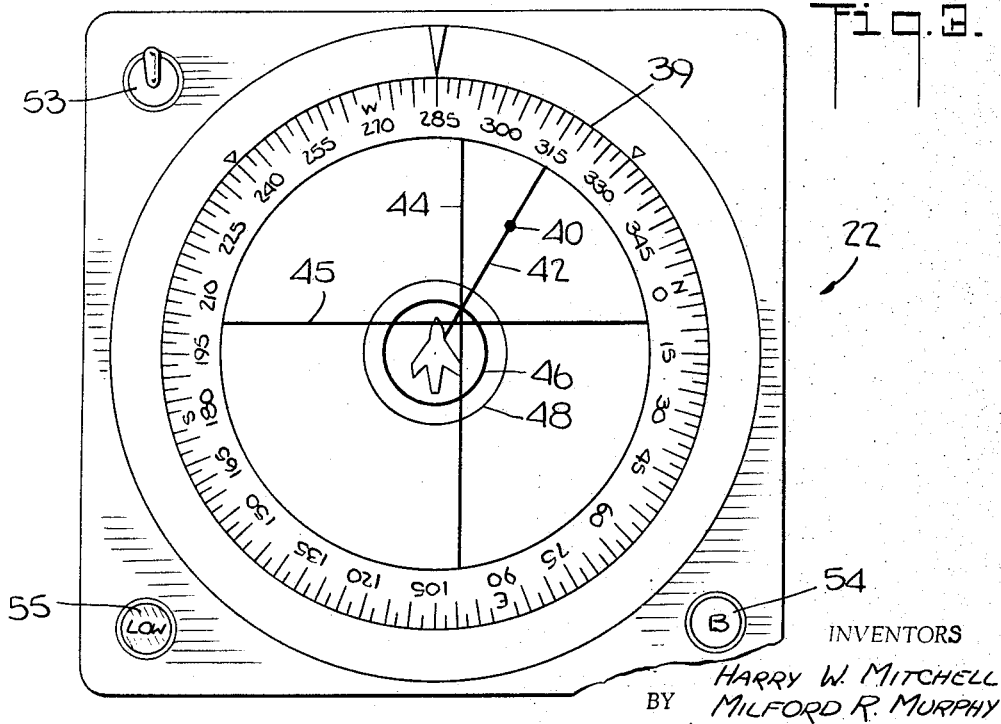
FIG. 3 is a front elevation of the horizontal display wherein is presented a top plan view of vehicle position with respect to a desired flight path, and the beacon, and the altitude of said aircraft with respect to a selected flight path altitude is also presented.

The presentation system 20, 22 transduces electrical analog flight information into a visual analog state and includes a cathode ray tube display or, if desired, an electromechanical display. FIGS. 2 and 3 pertain to a cathode ray tube display of information required for flights with no outside visual reference from take-off to touchdown. Two cathode ray tubes are used to categorize the flight information into vertical information (FIG. 2) and horizontal information (FIG. 3); which are the vertical display 20 and horizontal display 22 of FIG. 1. The horizontal information in the FIG. 3 display is operated at a comparatively high gain to accommodate the static and dynamic requirements for the approach-to, touchdown, and take-off phases of a flight. The vertical information in the FIG. 2 display, in general, will be used for cross country flights. Flight information may be categorized into vertical and horizontal plane information, the decoding of which is accomplished by the cathode ray tube display symbolically channeling this information to the pilot. The form factor of each cathode ray tube flight symbol is such that it has physical significance to its respective source of intelligence. As a result, recognition and, hence, the response of the pilot are speeded up and enhanced. The function of each flight symbol is described below with respect to its illustration in FIG. 2.

Flight path circle 24 symbolizes in vertical cross-section the selected flight path. Vertical and/or lateral positional error of the aircraft displaces the symbol 24 from the center of the display 20. The condition shown in FIG. 2 indicates that the aircraft is below and to the left of the selected flight path.

Flight dot 26 displaces vertically from the center of the display 20 to symbolize rate of change of altitude and laterally from the center to indicate deviations from a selected heading reference. The condition shown in FIG. 2 indicates that the aircraft is in a climb and has changed heading to the right. This flight condition would correct for the flight path error indicated by the position of the flight path circle 24 in FIG. 2. When the dot 26 is in the center of the tube, the aircraft is on the desired heading and is neither climbing nor descending.

Attitude symbol 30 displaces vertically to indicate pitch attitude and rotates clockwise and counterclockwise to indicate roll attitude. The condition shown in FIG. 2 indicates that the aircraft has rolled to the right to coordinate the turn and has a slightly nose-high attitude. Degree of pitch, i.e., nose up or nose down attitude, is referenced by indices 28 which may be etched upon the tube. The special attitude symbol 30 as shown could be replaced by one of the more usual types of attitude symbols such as a normally horizontal straight line. A normally horizontal straight line attitude symbol would, like the attitude symbol 30 shown, be displaced vertically to indicate pitch attitude and be rotated to indicate roll attitude. Such a symbol is shown as the trace 7 in United States Patent No. 2,463,529 to Ferrill, Jr.

Lateral ground speed dots 32 symbolize lateral ground speed in aircraft coordinates. The dots shown in FIG. 2 would be moving to the left to be compatible with the roll attitude as shown. These dots are normally locked in position until approximately three hundred (300) feet from touchdown and then are automatically released to indicate ground speed qualitatively by their rate of movement. These dots can also be manually released at any time.

Absolute altitude line 34 displaces downward from the center of the display 20 to indicate an increase in absolute altitude. Actually, the horizontal line 34 and central vertical line 35 are fixed in relation to each other and move together as a T. Horizontal line 34 approaches the central horizontal reference inscribed line 36 as the aircraft approaches the ground. Vertical inscribed line 37 illustrated here underlying vertical trace line 35 in FIG. 2 provides a lateral zero reference line for heading dot 26 and flight path circle 24.

Forward ground speed dots 38 symbolize fore and aft ground speed in aircraft coordinates. The dots move along vertical line 35 from the top of line 35 where it intersects with line 34 down to the bottom of the display area to indicate a forward ground speed. The lock and release of these dots are controlled by the same function as lateral ground speed dots 32.

In FIG. 3 heading ring 39 is slaved to a gyro magnetic compass (not illustrated).

In the horizontal information display of FIG. 3, beacon position dot 40 indicates beacon position relative to aircraft longitudinal axis. The condition shown in FIG. 3 indicates that the beacon is a certain distance out and thirty (30) degrees to the right, and on a bearing of 315 degrees.

Beacon reference line 42 supplements the beacon position dot 40 in defining the relative direction and bearing from the aircraft to the beacon. Beacon reference line 42 is especially necessary when beacon position dot 40 is close to the center of the FIG. 3 display. Line 42 always extends from the center of the display (aircraft position) through the beacon position dot 40 to compass heading ring 39 except when the radar antenna is searching for the beacon. During this search period beacon reference line 42 will sweep the tube face, indicating the instantaneous direction that the radar antenna is pointing.

Cyclic flight director lines 44 and 45 are commands to the pilot for pitch and roll cyclic control. When the lines are centered the cyclic control input is correct. The intersection of flight director lines 44 and 45 provides information to the pilot that enables him to fly in terms of polar coordinates. By flying the intersection, he displaces the cyclic stick in polar coordinates. The condition shown in FIG. 3 indicates that the cyclic stick should be moved back and to the left for the proper control input.

Altitude error circle 46 displaces concentrically with respect to altitude reference inscribed circle 48 to indicate altitude error as referenced to a selected altitude or glide-slope, as the case may be. The display indicates that the aircraft is below the selected altitude. When the aircraft is at the selected altitude, error circle 46 will coincide with the inscribed reference circle 48. When the aircraft is above the selected altitude, the error circle 46 will be greater than the inscribed reference circle 48.

Controls and indicators which may accompany the FIGS. 2 and 3 display components include: pitch attitude trim knob 49, roll attitude trim knob 50, brightness control knob 51, slip skid indicator 52, attitude display transfer switch 53, brightness control knob 54, beacon distance scale light 55 and low altitude warning light 56.

Figure 4:
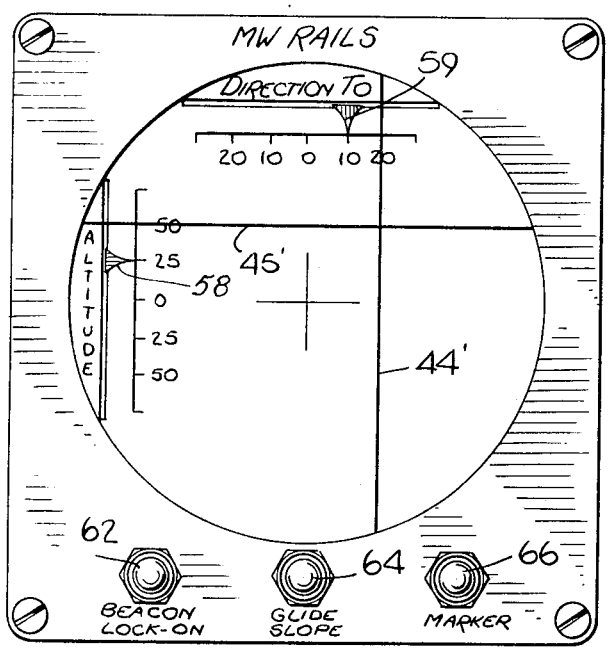
FIG. 4 is a front elevation of an electromechanical display wherein vehicle altitude, direction to touchdown, and cyclic control reference to desired flight path are presented.

FIG. 4 illustrates the functional type of electromechanical display that can be used for example, with a microwave system provided terminal operations are limited to visibility conditions where visual contact can be made with the landing surface prior to touchdown. Visual contact should be made at a minimum altitude of twenty-five (25) feet.

Since the terminal area operations with this instrument are limited to low visibility conditions, the presentation requirements can be reduced to three major readout functions. The flight director function 44' and 45' is identical in operation to the cyclic director vertical 44 and horizontal 45 lines on the cathode ray tube visual display 22 of FIG. 3. Pointer 58 on the left side of the instrument indicates altitude error and pointer 59 on the top of the instrument provides "direction to" information. Indicator lights 62, 64 and 66 are required to show, respectively, beacon lock-on, glide-slope intersection, and a distance marker to operate at two thousand (2000) feet distance from the beacon.

This electromechanical display of FIG. 4 is compatible with the control functions furnished by the Master Control i.e., mode and parameter selections are made in the same manner as with the cathode ray tube visual display. Since the "direction to" information only covers a sector, it is necessary for the pilot to rotate the course selection control on the Master Control Head 10 (see FIG. 5) until vertical line 44' of the Flight Director is centered and then change the heading of the ship accordingly. Ambiguity can be checked by correlating the direction of pointer 59 movement with the direction of rotation of the course selector; i.e., pointer 59 movement from left to right for clockwise rotation of the course selector would indicate a true reading.

Operation under the system

As will be apparent, integration of the functional capabilities of the foregoing described components into an operable system furnishes all-visibility mission capability for helicopters in unprepared remote areas. Fixed wing aircraft are furnished the same capabilities except that a location with a suitable landing strip is necessary if terminal area operation is required. This system is also applicable to any surface vehicle such as landing barges, boats, amphibious vehicles and the like.

An area is prepared for all-visibility operations by equipped vehicles simply by selecting a suitable tactical location for a position reference and defining this location with the active portable transponder beacon 12. The beacon 12 is in a standby mode after power has been applied, and thereafter establishes a potential instrument navigation and landing system in the local area for properly equipped vehicles. After the beacon 12 has received an adequate number of interrogations to confirm the presence of an interrogating signal, power is automatically applied to the radar 14 transmitter and the beacon 12 starts replying to the interrogations. If the interrogations are lost for a prescribed length of time, the beacon 12 is automatically returned to the standby mode to preserve battery life.

Once the beacon 12 has been positioned any properly equipped vehicle can be furnished an earth reference. The equipped vehicle tracks this reference to get relative direction and distance information, operates on this information and displays it to the pilot. The displayed information enables the pilot to navigate, land, and take off with no outside visual reference.

Magnetic navigation mode capabilities are incorporated into the system as a means of navigating by "dead reckoning" to a beacon area and navigation also from one beacon area to another. During magnetic navigation mode operation the following sensor information is displayed: airspeed, barometric altitude, heading, attitude, rate of climb, and absoluate altitude (if the sensor for the latter is available). The flight parameters which the pilot is flying (namely, airspeed, barometric altitude and heading) are sensed and summed with their respective preselected values, as shown in FIG. 5. The error signals from these three summations are operated on by the display generator 18 to produce the proper movements of the respective cathode ray tube symbols of FIGS. 2 and 3. Attitude, rate of climb, and absolute altitude describe the present flight condition and are symbolically presented as such. The system, of course, may accept information from other commonly used navigation systems in order to navigate from one beacon area to another.

The application and operation of beacon landing mode can best be presented by description of a typical mission. Assume that in accordance with the available conventional navigation information, i.e., dead reckoning, doppler navigator, etc. an equipped vehicle has navigated to what is believed to be a particular beacon area. To determine whether or not the aircraft has in fact reached the area of influence of that particular beacon, the pilot selects a code that is peculiar to the particular beacon 12 by properly positioning a beacon selector control. This operation turns on the radar 14 UHF transmitter, which furnishes the interrogation signals, and also starts the airborne radar unit 14 searching in direction, azimuth and elevation. If the particular beacon 12 is within a communicating range, and after the beacon 12 has received an adequate number of interrogations to confirm the presence of an interrogation signal, the beacon 12 will start replying. After the airborne radar 14 microwave receiver unit starts receiving the beacon 12 replies, one additional search (azimuth and elevation) is made to set up the automatic gyro compass circuitry in accordance with the strongest signal such that the receiver will only receive the strongest signal via the main lobe. When the main lobe of the antenna "looks" at the beacon 12 the second time, the circuitry has been prepared such that the antenna positioning system will stop searching in direction and is sequenced into a directional track mode. This "lock-on" function initiates the range search and track function.

The pilot can view the above described search and "lock-on" sequence on the horizontal (FIG. 3) cathode ray tube display 22. During the directional search beacon reference line 42 on the FIG. 3 display 22 furnishes a visual indication of the antenna position such that the range search and track modes can easily be identified. After beacon reference line 42 stops rotating, which indicates directional track, the pilot will see beacon dot 40 move along beacon reference line 42 indicating range search. Beacon dot 40 will, of course, stop when the range tracking unit switches to the track mode. This cathode ray tube display 22 confirms the presence of the particular beacon being interrogated and also provides a visual indication when the state of the system is such that the pilot can switch from the aforementioned navigation mode to the beacon landing mode. The switch from navigation mode to landing mode may be made either before or after the selection of the desired flight parameters (e.g. direction to beacon, glide-slope) for landing. For example, assume that the pilot is flying heading, airspeed, and barometric altitude and also, that the beacon reference line 42 indicates that the beacon 12 is on a bearing of thirty (30) degrees; the best procedure would be to check the position of glide-slope, lateral offset, and landing position controls to see if they are in the desired position, change the course selector to a bearing of thirty (30) degrees, change the heading of the aircraft accordingly, and switch the mode selector from magnetic navigation mode to beacon landing mode. The pilot will continue to fly barometric altitude and airspeed as before, unless a change is desired. The barometric altimeter will furnish the altitude information until the glide-slope is intersected, at which point a function is generated to change the altitude error sensing circuitry to glide-slope error and the pilot continues to control altitude error as before. Airspeed is controlled in accordance with the selected value until the automatic programming feature takes over, which is a function of the selected airspeed and the distance to the selected landing spot. The automatic programming feature commands an airspeed as a function of the distance to the touchdown spot via the cyclic flight director lines 44, 45.

The next visual display experienced by the pilot is illumination of the six thousand (6000) foot beacon distance indicator light 55, which serves as a distance check point for the pilot and also alerts him to the beacon distance scale change on the FIG. 3 display. Beacon distance indicator light 55 is located on the lower left corner of the FIG. 3 display. In many cases beacon distance indicator light 55 will be operated prior to the glide-slope intersection, i.e., especially in low altitude flights. Prior to touchdown the computer 16 automatically transitions the controlling function from airspeed to ground speed such that touchdown can be made at zero ground speed. The transition control operates in response to the null condition of a control signal. The control signal is the difference between (1) the sum of a ground speed signal and a signal representing wind vector along the longitudinal axis of the aircraft, and (2) a reference signal representing a reference difference. Thus, the transition will occur at a distance further out if a head wind exists. Since this transition occurs over a period of about fifteen (15) seconds, the pilot is not necessarily aware of the changeover except that he is required to operate at a higher gain. The last check point prior to landing occurs at a distance of three hundred (300) feet out and is indicated to the pilot by the automatic "unlocking" of the lateral and forward ground speed dots 32 and 38 (FIG. 2) to provide qualitative ground track. The purpose of these ground speed dots is to provide the pilot with touchdown information only.

When flying the display, the pilot will land on a specific radial from the beacon 12. A lateral offset feature offers the pilot the capability of flying a parallel course to the specific radial and proceeding to land by changing the lateral offset control to zero and then selecting the desired landing radial. An application of this lateral offset feature would be for group mobility of a plurality of helicopters, i.e., each helicopter would be assigned a lateral offset for flight and a landing location on a particular radial which, in essence, furnishes a space alocation function to the system.

Beacon Navigation mode of operation is identical to Beacon Landing Mode except that the aircraft is not programmed down a glide-slope. An application of the Beacon navigation mode would be for short range navigation in a beacon area or for a path finder type mission that would require beacons to be located to form a navigation path. The offset course function can be used to great advantage during this mode of flight since the vehicle is not necessarily required to fly directly to or over a beacon. For example, beacons could be located on the side of a canyon and a helicopter could fly down the canyon.

*Principles of computing and signal processing*

The airborne radar 14 searches, locks-on, and tracks the reference beacon 12 as previously described. The computer 16 accepts, "operates on" and processes the radar 14 furnished information to the display generator 18, which symbolically channels this information to the pilot via the vertical and horizontal information displays 20 and 22 (as shown in detail in FIGS. 2 and 3).

FIGS. 5a and 5b are a block and schematic diagram of one design of a computer 16 that will provide the proper transfer function between the sensor signals and the desired display generator inputs. For comprehensibility, the selector functions of the control head 10 are included in FIGS. 5a and 5b. These selector functions include the various knobs that the pilot has available and through which he selects the desired flight parameters. The knobs dial into the computer 16 signals representing the desired values of the flight parameters. These dialed-in signals are then compared within the computer 16 with the appropriate ones or combinations of sensor signals to provide error signals as the computer 16 outputs. These error signals then determine the position or size or speed of the appropriate ones of the various symbols on the display units 20, 22. As will be evident from the following discussion, some of the computer outputs are not error signals and some of the signals grouped with the computer outputs are not even processed by the computer but come directly off the various sensors. As an aid to comprehensibility, the various sensors are also shown in FIGS. 5a and 5b whether their output is fed into the computer 16 or is fed unchanged through to the display generator 18.

The sensors whose outputs are processed by the computer 16 are: (1) the radar 14 with its three outputs, (i) slant distance from beacon, (ii) depression angle and (iii) azimuth, (2) the vertical gyro 70 at the top center of FIG. 5a, (3) the gyromagnetic compass 72 at the left center of FIG. 5a, (4) airspeed 74 at the left center of FIG. 5b, and (5) barometric altitude 76 at left center of FIG. 5b.

The sensors which have an output that is fed to the display generator 18 without computer processing are: (1) the vertical gyro which provides a pitch signal $h1$ and a roll signal $h2$, (2) the cyclic control stick transponder which provides a pitch signal $i1$ and a roll signal $i2$, (3) the rate of climb transducer to provide a rate of climb signal $k$, (4) the absolute altimeter to provide an absolute altitude signal $j$, and (5) the radar 14 which contains an antenna azimuth resolver to provide the antenna azimuth signal $l$. It might be noted that the vertical gyro 70 and radar 14 outputs are also processed by the computer 16 as well as applied directly to the display generator 18.

As to the control head 10 functions shown in FIGS. 5a and 5b, there are: (1) the glide-slope selector 111 at top center of FIG. 5a, (2) the touchdown distance selector 109 at the upper right of FIG. 5a, (3) the course detector 133 near the upper right of FIG. 5a, (4) the parallel course selector 135 at center right of FIG. 5a, (5) the airspeed selector 145 at lower left of FIG. 5a, and (6) altitude selector 115 at upper left of FIG. 5b. The switch SW–1 that selects the mode of operation is also in the control head 10.

According to the suggested computer 16 circuit in FIGS. 5a and 5b, the electrical analog of slant distance of the aircraft from the ground reference beacon 12 as determined by the airborne radar 14 is used to excite the resolver chain in the computer 16, the resolver outputs being distance vectors. The first component of the resolver chain is the depression resolver 113 which resolves the slant distance from the aircraft to the reference ground beacon 12, as determined by the radar 14, into coordinates relative to the airframe (commonly identified as aircraft coordinates in distinction to earth coordinates). The computer 16 changes the aircraft coordinates to earth coordinates by summing and/or decoupling "out," by means of attitude summing resolver 103 and decoupler 105, the depression and azimuth angle errors which are a function of aircraft attitude, heading, antenna azimuth and depression angles. This technique, (which stabilizes the data relative to a vertical reference and magnetic north) is favored over employing more elaborate equipment upon a stabilized platform as it increases reliability while decreasing weight and cost.

The coordinate outputs of the attitude summing resolver 103 are electrical measurements of the vertical and horizontal distance to the reference ground beacon and are applied to the glide-slope resolver 107 located on the master control unit 10 (control head of FIG. 1) so that manual control can be applied by the pilot through glide-slope selector 111. The glide-slope resolver 107 is aligned by the pilot through glide-slope selector 111. Thus, when the aircraft is on the selected glide-slope the glide-slope resolver output signal is at a null. This signal is summed with the signal from the touchdown distance selector 109 which gives the pilot the capability of selecting a touchdown distance from the ground reference beacon. During beacon landing mode and after the glide-slope has been intersected, the summed signal from the glide-slope resolver 107 and the touchdown distance selector 109 is processed to vertically displace flight path circle 24 shown in FIG. 2 and determine the diameter of the altitude error circle 46 in FIG. 3.

Gain changer 104 changes the sensitivity of the slant distance analog voltage emanating from the airborne radar 14. Relay $K_2$ is actuated through the radar at a prescribed distance from the beacon to change the sensitivity. Relay contact $K_{2a}$ provides the portion of the computer system (from the radar 101 through to the glide-slope resolver 107) with a higher voltage range or sensitivity for effective operation of the units. Gain changers 108 and relay contacts $K_{2e}$ operate to compensate for the sensitivity change effected by relay contact $K_{2a}$ so that the symbol deflection sensitivities are not affected.

Relay $K_3$ operates when the summed input signal to its adjacent amplifier is at zero or goes through zero, indicating that the selected glide-slope is being intercepted. The output of the glide-slope resolver 107 and the touchdown distance selector 109 will sum to zero at the time of intersection as will the output for the altitude selector 115 and the barometric altitude 76 (FIG. 5b) indicating that the pilot is flying at the selected altitude. This zero output or null between barometric altitude 76 and altitude selector 115 will occur prior to intercept of the selected glide-slope by the pilot controlling the flight path so that circle 24 on FIG. 2 is vertically centered in the display.

Relay $K_3$ is in series with relay $K_1$ through relay contact $K_{1a}$ which means that relay contact $K_{1a}$ has to be closed before relay $K_3$ can be operated. Also, the mode selector switch SW–1 must be in the land position (SW–1a closed, as shown), before relay $K_3$ can be operated. Thus, the relay $K_3$ is inoperative unless the radar has locked on to the beacon and the mode selector is in the proper (land) position. After $K_{1a}$ and SW–1a are closed, the relay $K_3$ is in an energized condition until the glide-slope is intercepted. When relay $K_3$ is deenergized, upon entering the glide-slope, relay contact $K_{3b}$ is closed to ensure continual deenergization of relay $K_3$ for a specified time period (30 sec. hold, for example, shown in FIG. 5a) until an error or voltage difference is developed between the altitude selector 114 and barometric altitude 76, which voltage acts to maintain the relay $K_3$ in a deenergized state. In the absence of this hold feature, before the craft could descend along the glide-slope path to build the voltage difference between altitude selector 115 and barometric altitude 76, which acts to maintain relay $K_3$ in a deenergized state, a gust of wind moving or translating the craft off the glide-slope could cause energization of relay $K_3$ and the signal from the glide-slope resolver would not be zero and could be wrong phase.

As previously stated, prior to intersection of the glide-slope the pilot tries to maintain a zero difference or null between the output of the altitude selector 115 and the barometric altitude 76. When relay $K_3$ is operated at glide-slope intersection, relay contact $K_{3a}$ switches the sensing source for vertical displacement of the flight path circle 24 from barometric altitude error to glide-slope error.

The output of the antenna azimuth resolver 117 is corrected to earth coordinates by the azimuth summing resolver 119 which correlates heading information furnished by the gyromagnetic compass 72. This is accomplished through a servo loop consisting of azimuth washout resolver 123, amplifier 125, motor 127, and the gear train (GT) 129. Also, any error in azimuth caused by coupling in attitude changes will be fed into the servo system from decoupler 105 for proper azimuthal corrections.

The information now being supplied to the course selector resolver 131 from the azimuth summing resolver 119 is in earth coordinates and referenced to the ground reference beacon. The pilot will establish a desired or selected course to the beacon by "dialing in" or positioning the course selector 133 which is connected to the course selector resolver 131. The signal from the course selector resolver is used to laterally displace the flight path circle 24 (FIG. 2) and when the desired or selected path is intersected by the actual flight path as determined by the information supplied from the azimuth summing resolver 119 to the course selector resolver 131, the output of course selector resolver 131 is nulled or zero (that is, flight path error circle 24 is centered laterally).

The parallel course resolver 135 allows the pilot to select and fly a course parallel to and either side of the selected course to the beacon by producing a voltage analog equal to the distance desired from the selected course and then summing that voltage with the output of the course selector resolver 131. The output of this summed signal will displace the flight path circle 24 (FIG. 2) laterally in accordance with the resultant difference. Of course, when the aircraft is then flown on this course, which is displaced parallel to the selected course, the flight path circle 24 will be laterally centered on the tube 12 as the resultant voltage difference is zero.

The heading selector resolver 137 is electrically connected to the output of the gyromagnetic compass 72 and, in conventional manner, its electrical output represents the difference in angles between the gyromagnetic compass 72 and the selected heading. In addition, it is mechanically connected to the course selector resolver 131 so that course selector 133 also functions to select a reference course. When this selected heading is reached by the aircraft, the output of heading selector resolver 137 is at a null. When the actual heading as indicated by the gyromagnetic compass 121 is different than the heading selected through heading selector resolver 137, a voltage is developed which laterally displaces flight dot 26 (FIG. 2).

Differentiating circuits 139 and 141 furnish information for longitudinal and lateral ground speed by taking the derivative of the outputs (longitudinal and lateral distance to the beacon in the horizontal plane) from the azimuth summing resolver 119. This derived information is then resolved into aircraft coordinates through the aircraft coordinate resolver 143 and is summed with attitude, distance, stick position as previously described. These outputs drive the respective ground speed dots 32 and 38 (FIG. 2) to furnish qualitative ground speed. The air speed selector 145 (FIG. 5a) supplies a voltage analogous to the desired or selected airspeed and feeds this voltage into the gain changer and transitioner 147 (FIG. 5b) through relay contact $K_{4a}$. This desired air speed is compared to the actual airspeed 74 (FIG. 5b) and the algebraic summation is used to provide a first air speed error signal to displace the horizontal flight director line 45. Flight director line 45 is recentered or corrected by a proportional movement of the cyclic stick on the part of the pilot.

The gain changer 147 automatically transitions from airspeed (AS) to ground speed (GS) prior to touchdown and also increases the sensitivities for deflecting the flight director lines 44, 45 in order to accommodate the high precision requirements of touchdown as compared to the lesser requirements for navigation.

As heretofore noted the aircraft operates at a selected airspeed until automatic programming is introduced. This automatic programming directs the pilot to decelerate the aircraft by means of the horizontal flight line 45 (FIG. 3).

The automatic programming feature is accomplished by comparing the "selected airspeed" signal and the horizontal "distance from touchdown signal" so as to operate relay $K_4$ at a prescribed relationship of the measured distance from touchdown point to the selected airspeed (for example, at 80 knots the relay could operate so as to initiate automatic programming at 4,000 feet from touchdown, etc.). Relay contact $K_{4a}$ switches in response to the actuation of relay $K_4$ and allows the gain changer 147 to compare measured airspeed with the horizontal distance from touchdown to provide a second air speed error signal and thereby control the airspeed as a function of distance from touchdown. The gain changer 147 is operated by relay $K_5$ which is actuated by an algebraic summation of ground speed, airspeed 74 and the programmed speed at a predetermined distance from touchdown to allow the gain changer 147 to compare longitudinal ground speed with horizontal distance from touchdown to provide a longitudinal ground speed error signal and thereby control ground speed, immediately prior to touchdown, as a function of distance from touchdown. If the airspeed and ground speed are equal (zero wind) the relay $K_5$ will, for example, operate at 2000 feet from touchdown. For a head wind condition the relay $K_5$ will operate at a higher airspeed and at a further distance from touchdown.

As shown, relay $K_4$ is interlocked with the nav-land switch SW-1 so that the automatic programming feature cannot be activated until the pilot selects the beacon land mode. Relay $K_4$ is also shown interlocked with relay $K_2$, the sensitivity change relay from radar, so that relay $K_4$ cannot operate until after the sensitivity change has also occurred.

Similarly, relay $K_6$ is shown interlocked with the nav-land switch SW-1 and with relay $K_2$ so that it cannot be operated until the pilot has selected the beacon land mode and until the sensitivity change has taken place. Relay $K_6$, as previously described, unlocks the ground speed dots 32 and 38 (FIG. 2) prior to touchdown. It is clear from its interlocking with the nav-land switch SW-1 and relay $K_2$ will permit operation of the ground speed dots 32 and 38 only in the period immediately prior to touchdown, this display not being required under normal flight conditions. This period is determined by the preset 300 foot reference 151.

The display generator 18 accepts and operates on computer 16 outputs to provide each signal with a direction and magnitude intelligence peculiar to the driving requirements of their respective flight symbols. For example, computer output $c$ is an algebraic summation of one of the following three combinations of signals: (1) selected airspeed and measured airspeed for "cross-country" operation to provide a first air speed error signal, (2) measured airspeed and distance to touchdown for the approach phase to provide a programmed air speed error signal, or (3) measured ground speed and distance to touchdown just prior to and during touchdown to provide a programmed ground speed error signal. As is shown in FIG. 7, this summed signal $c$ is mixed with pitch attitude information and cyclic control and is processed to drive the horizontal cyclic flight director line 45 in the FIG. 3 display. Since the pilot flies to minimize the lateral flight path position error signal $b$, there will normally be little or no lateral deviation from the desired flight path. As a consequence, the horizontal distance to touchdown signal adequately represents longitudinal distance to touchdown. Computer output $d$ is mixed and processed identically as is output $c$ (except that airspeed 74 is not used) to drive vertical cyclic flight director line 44 in the FIG. 3 display. However, since the pilot will normally fly to provide a zero lateral flight path position error signal $b$, lateral ground speed will in effect be programmed for zero. Thus the computer output error signal $d$ is, after relay $K_5$ has been actuated, in effect a lateral ground speed error signal. That is, the effect of any output error signal $d$ is to cause the pilot to fly in such a fashion as to minimize lateral ground speed.

Both cylic flight director lines 44 and 45 operate to produce a director type display, i.e., command position for cyclic control. The gain ratios of the feedback loops are in accordance with the stability requirements of the aircraft.

As will be apparent, various modifications in the suggested circuitry, including rearrangement and substitution of components, might be effected and various changes in the character and mode of presentation of display symbols might be effected without departing from the spirit and scope of invention, as defined in the subjoined claims.

The various signals $a$ through $m$ provided by the FIG. 5 computer are employed to determine the position of various symbols in the displays in the FIG. 2 and FIG. 3 displays. The FIG. 6 and FIG. 7 block diagrams illustrate how the computer 16 output signals are combined and commutated and applied to certain symbol generators 18V, 18H so that the information in the computer 16 output signals is displayed on the horizontal and vertical display tubes. It should be noted that for simplicity all of the fifteen information signals $a$ through $m$ are called computer 16 output signals but that in fact certain of these signals come directly off the appropriate transducer and are not operated upon by the computer 16. For example, the rate of climb signal $k$ is taken directly off a standard rate of climb transducer 80. By contrast, the vertical flight path position error signal $a$ is produced by the computer 16 from various settings of the computer 16 operating on the output signals from the barometric altimeter 76 and radar 14 (including the radar antenna depression angle signal).

In broad terms, the arrangements illustrated in FIGS. 6 and 7 involve the generation of various unique symbols. Each symbol is employed to represent one or more computer 16 output signal. The particular signal (or combination of signals which are represented by the corresponding symbol that is generated) is applied to the appropriate symbol generator in order to affect the position, size or other characteristic of the symbol. Thus, the symbol can effectively carry the information in the signal. The symbol, appropriately biased by the corresponding signals, is fed through a commutator to a cathode ray tube display 20, 22. The commutator cycles through the various symbols (feeding them one at a time to the display tube) at a rate sufficiently great so that each symbol appears continuously on the display tube and a concurrent display of all of the symbols is obtained.

FIG. 6 illustrates the generation of the vertical display 20. In FIG. 6, the absolute altitude symbol (composed of the lines 34 and 35 formed in the shape of a T) is generated by the symbol generator 150. This T symbol 34, 35 is fed through the Y axis commutator 152 and X axis commutator 154 to the display 20. The absolute altitude signal $j$ after amplification by amplifier 155, vertically displaces the T symbol 34, 35 so that its displacement from the horizontal axis is a measure of the magnitude of the absolute altitude signal $j$. Prior to being fed to the commutators 152, 154, the absolute altitude symbol 34, 35 is overlaid with moving dots 32 along the horizontal line 34. These dots 32 are directly responsive to the lateral ground speed signal $f$ so that the direction of motion and rate of motion of the dots 32 is a function of the magnitude and polarity of the lateral ground speed signal $f$. Similarly, dots 38 are overlaid on the vertical bar 35 of the absolute altitude signal and are made responsive to the longitudinal ground speed signal $e$ so that the direction of motion and rate of motion of the dots 38 along the vertical line 35 is a function of the polarity and magnitude of the longitudinal ground speed signal $e$. In order to obtain the compound symbol, the longitudinal ground speed signal $e$ and lateral ground speed signal $f$ are fed directly to the absolute altitude symbol generator 150. It is convenient to combine the absolute altitude symbol 34, 35 with the lateral ground speed symbols 32 and longitudinal ground speed symbol 38 so that the combination is commutated as a unit. By decreasing the total number of combined symbols which have to be commutated by commutators 152 and 154, there is an increase in the time available for each signal to be traced on the display 20 and thus an increase in the display intensity of each symbol.

The circular symbol 24, whose position on the vertical display 20 indicates vertical and horizontal displacement from the selected flight path, is generated by the generator 156. The two 90° out of phase sinusoidal signal employed to generate the flight path position error symbol 24 are fed to respective commutators 152 and 154. In the Y axis commutator 152, one of the sinusoidal signals is biased by the vertical flight path position error signal $a$, which signal $a$ has been amplified by amplifier 158. The other sinusoidal signal is biased in the X axis commutator 154 by the lateral flight path position error signal $b$, which signal $b$ has been amplified by amplifier 159.

The attitude symbol 30 which indicates both pitch and roll is generated at generator 160. The angular position of the pitch reference line 30A represents roll. The vertical gyro roll signal $h2$ is fed to the generator 160 so that the symbol 30 is fed to the commutators 152 and 154 with the proper angle on it. The vertical gyro pitch signal $h1$ is amplified by amplifier 161 to bias the symbol 30 at the Y axis commutator 152 thereby displacing the symbol 30 along the Y axis to indicate the pitch of the helicopter.

The flight dot symbol 26 is generated by generator 162. The rate of climb signal $k$ (after amplification by amplifier 163) biases the flight dot 26 at the Y axis commutator 152 and the selected heading reference error signal $g$ (after amplification by amplifier 164) biases the flight dot signal 26 at the X axis commutator 154. In this fashion, the flight dot symbol 26 is deflected vertically to represent rate of climb and horizontally to represent the heading error.

FIG. 7 illustrates the symbol generation and commutation within the display generator 18 that is required for the horizontal display 22.

The flight director lines 44 and 45 are generated by the symbol generator 166. The vertical trace 44 and the horizontal trace 45 are generated separately and separately deflected. Thus the horizontal trace 45 is fed to the Y axis commutator 167 where it is deflected vertically by the output of the amplifier 170. As has been described above, the amplifier 170 output represents the mixing of the following three signals: (1) cyclic control stick transducer pitch signal $i1$, (2) the vertical gyro pitch signal $h1$, and (3) the error signal $c$ which is the summed horizontal distance to touchdown and air speed/ground speed signal.

The vertical trace 44 is fed to the X axis commutator 168 and is there biased by the output of the amplifier 171. This bias signal represents the summation of the following three signals: (1) the cyclic control stick transducer roll signal $i2$, (2) the vertical gyro roll signal $h2$, and (3) the error signal $d$ which is the summed lateral flight path position error and lateral ground speed signal. In this fashion the horizontal displacement of the vertical trace 44 on the display 22 is determined by the summation of these three signals.

The vertical flight path position error symbol 46 is generated by symbol generator 172. The vertical flight path position error signal $a$ (which has been amplified by the amplifier 158) is further amplified by the amplifier 173 and then applied to the symbol generator 172 to determine the radius of the error symbol 46. The symbol 46 is then fed to the horizontal display 22 through the commutators 167 and 168.

The beacon reference line 42 together with the beacon position dot 40 are generated by the symbol generator 174. The radar 14 antenna azimuth signal $l$ is applied to the symbol generator 174 in order to determine the angular position of the beacon reference line 42. The position of the dot 40 along the line 42 is determined by the horizontal distance to touchdown signal $m$.

Just as various modifications in the design of the computer 16 may be made without departing from the scope of this invention, so too may various design modifications be incorporated in the display generator 18 design and yet remain within the scope of the invention.

Accordingly, it is to be understood that the scope of the following claims includes all such variations as would be apparent to those skilled in this art.

What is claimed is:

1. In an aircraft navigational system to permit instrument landing to touchdown at a desired spot on a landing site, wherein a beacon located at the desired landing site transmits a locating signal, the aircraft borne apparatus comprising:
   (a) a radar transceiver responsive to said locating signal transmitted by said beacon to provide a slant distance to beacon signal, an antenna azimuth signal, and an antenna depression angle signal,
   (b) first means responsive to said slant distance to beacon signal and to said antenna depression angle signal to provide a height to beacon signal and a horizontal distance to beacon signal,
   (c) glide slope selector means to provide a desired glide slope angle signal,
   (d) second means for comparing said horizontal distance to beacon and height to beacon signals with said desired glide slope angle signal to provide a vertical flight path position error signal,
   (e) third means responsive to said horizontal distance to beacon signal and to said antenna azimuth signal to provide longitudinal and lateral distance to beacon signals in aircraft coordinates,
   (f) compass means to provide a heading information signal,
   (g) fourth means responsive to said heading information signal and to said longitudinal and lateral distance to beacon signals in aircraft coordinates to provide longitudinal and lateral distance to beacon signals in earth coordinates,
   (h) course selector means to provide a desired course to the beacon signal,
   (i) fifth means for comparing said desired course to beacon signal with said lateral and longitudinal distance to beacon signals in earth coordinates to provide a lateral flight path position error signal,
   (j) sixth means for comparing said desired course to beacon signal with said heading information signal to provide a selected heading reference error signal,
   (k) seventh means responsive to said lateral and longitudinal distance to beacon signals in earth coordinates and to changes in said heading information signal to provide lateral and longitudinal ground speed signals in aircraft coordinates,
   (l) air speed sensor means to provide a measured air speed signal,
   (m) air speed selector means to provide a desired air speed signal,
   (n) eighth means for comparing said desired air speed signal with said horizontal distance to beacon signal to initiate programmed air speed deceleration at a predetermined relationship between said compared signals,
   (o) ninth means for comparing said measured air speed signal with said longitudinal ground speed signal in aircraft coordinates to initiate programmed ground speed deceleration at a predetermined relationship between measured air speed and longitudinal ground speed,
   (p) tenth means for successively ($i$) comparing said desired air speed signal with said measured air speed signal to provide a first air speed error signal, ($ii$) comparing said measured air speed signal with said horizontal distance to beacon signal to provide a second air speed error signal after said eighth means has initiated said programmed air speed deceleration, and ($iii$) comparing said longitudinal ground speed in aircraft coordinates signal with said horizontal distance to beacon signal to provide a longitudinal ground speed error signal after said ninth means has initiated said programmed ground speed deceleration, and
   (q) eleventh means for comparing said lateral flight path position error signal with said lateral ground speed signal to provide a lateral ground speed error signal after said ninth means has initiated said programmed ground speed deceleration.

2. The aircraft navigational system airborne apparatus of claim 1 wherein said seventh means includes:
   differentiator means responsive to said lateral and longitudinal distance to beacon signals in earth coordinates to provide lateral and longitudinal ground speed signals in earth coordinates, and
   means responsive to changes in said heading information signal and coupled to said ground speed signals in earth coordinates to provide said lateral and longitudinal ground speed signals in aircraft coordinates.

3. The aircraft navigational system airborne apparatus of claim 1 further including:
   a vertical gyro sensor to provide a vertical gyro signal having a pitch component and a roll component,
   a rate of climb sensor to provide a rate of climb signal,
   an absolute altimeter sensor to provide an absolute altitude signal,
   a vertical display including:
   (1) a second display tube,
   (2) means for generating and displaying a circular symbol on said second display tube, the vertical position of said circular symbol being determined by said vertical flight path position error signal and the horizontal position of said circular symbol being determined by said lateral flight path position error signal,
   (3) means for generating and presenting a T symbol on said second display tube, the vertical bar of said T being centered on the display, the horizontal bar of said T symbol being deflected below the X-axis of said display tube by a magnitude that is determined by said absolute altitude signal, (4) means for generating and displaying an attitude symbol on said second display tube, the vertical position of said attitude symbol being determined by said pitch component of said vertical gyro signal and the angular position of said attitude symbol being determined by said roll component of said vertical gyro signal, (5) means for generating and displaying a dot symbol on said second display tube, the vertical position of said dot symbol being determined by said rate of climb signal and the horizontal position of said dot symbol being determined by said selected heading reference error signal, (6) means for generating moving dots on said horizontal bar of said T symbol, the rate of movement of said moving dots being determined by said longitudinal ground speed signal, and (7) means for generating moving dots on the vertical bar of said T symbol, the rate of movement of said moving dots being determined by said lateral ground speed signal.

4. The aircraft navigational system airborne apparatus of claim 1 further including:

a vertical gyro sensor to provide a vertical gyro signal having a pitch component and a roll component, a cyclic control sensor to provide a cyclic control signal having a pitch component and a roll component, a horizontal display including:

(1) a first display tube, (2) means for generating and displaying a circular symbol on said first display tube, the radius of said circular symbol being determined by said vertical flight path position error signal, (3) means for generating and displaying a radial line symbol on said first display tube, the angular position of said radial line symbol being determined by said radar antenna azimuth signal, (4) means for generating and displaying a dot symbol on said radial line symbol, the position of said dot symbol along said radial line symbol being determined by said horizontal distance to beacon signal, (5) means for generating and displaying a vertical flight director line symbol on said first display tube, the horizontal position of said vertical line symbol being determined by the sum of (*i*) the roll component of said cyclic control signal, (*ii*) the roll component of said vertical gyro signal and (*iii*) successively, said lateral flight path position error signal and said lateral ground speed error signal, and (6) means for generating and displaying a horizontal flight director line symbol on said first display tube, the vertical position of said horizontal line symbol being determined by the sum of (*i*) the pitch component of said cyclic control signal, (*ii*) the pitch component of said vertical gyro signal and (*iii*) successively, said first air speed error signal, said second air speed error signal, and said longitudinal ground speed error signal, first switch means to switch the third component of the control signal for said horizontal flight director line symbol from said first air speed error signal to said second air speed error signal at a first programmed position along the landing glide slope, and second switch means to switch the third component of the control signal for said horizontal flight director line symbol from said second air speed error signal to said longitudinal ground speed error signal at a second programmed position along the landing glide slope, and to switch the third component of the control signal for said vertical flight director line symbol from said lateral flight path position error signal to said lateral ground speed error signal at said second programmed position along said landing glide slope.

5. The aircraft navigational system airborne apparatus of claim 1 further including:

a vertical gyro sensor to provide a vertical gyro signal, and means responsive to said vertical gyro signal and to said horizontal distance to beacon and to said height to beacon signals to provide vertically stabilized horizonal distance to beacon and height to beacon signals, whereby said horizontal distance to beacon and height to beacon signals are, respectively, vertically stabilized horizontal distance to beacon and height to beacon signals.

6. The aircraft navigational system airborne apparatus of claim 5 wherein said fourth means further includes means responsive to said vertical gyro signal to decouple out the effect of aircraft attitude thereby providing said longitudinal and lateral distance to beacon signals in vertically stabilized form.

7. The aircraft navigational system airborne apparatus of claim 1 further including:

touchdown distance selector means to provide a desired horizontal distance between touchdown and beacon signal and to provide a corresponding vertical correction signal, means responsive to said desired horizontal distance between touchdown and beacon signal and to said horizontal distance to beacon signal to provide a horizontal distance to touchdown signal, and means responsive to said vertical flight path position error signal and to said vertical correction signal to provide a corresponding corrected vertical flight path position error signal, whereby said longitudinal and lateral distance to beacon signal will be longitudinal and lateral distance to touchdown signals.

8. The aircraft navigational system airborne apparatus of claim 7 further including:

parallel course selector means to provide a lateral offset signal, and means responsive to said lateral flight path position error signal and to said lateral offset signal to provide a modified lateral flight path position error signal.

9. The aircraft navigational system airborne apparatus of claim 8 further including:

a vertical gyro sensor to provide a vertical gyro signal, means responsive to said vertical gyro signal and to said horizontal distance and height to beacon signals to provide vertically stabilized horizontal distance and height to beacon signals, whereby said horizontal distance to beacon and height to beacon signals are, respectively, vertically stabilized horizontal distance to beacon and height to beacon signals, said fourth means further including means responsive to said vertical gyro signal to decouple out the effect of aircraft attitude thereby providing said longitudinal and lateral distance to touchdown signals in vertically stabilized form, said seventh means including differentiator means responsive to said lateral and longitudinal distance to touchdown signals in earth co-ordinates to provide lateral and longitudinal ground speed signals in earth co-ordinates and means responsive to changes in said heading information signal and coupled to said ground speed signals in earth co-ordinates to provide said lateral and longitudinal ground speed signals in aircraft coordinates.

10. The aircraft navigational system airborne apparatus of claim 9 further including:

a vertical gyro sensor to provide a vertical gyro signal having a pitch component and a roll component, a cyclic control sensor to provide a cyclic control signal having a pitch component and a roll component, and a horizontal display including:
(1) a first display tube,
(2) means for generating and displaying a circular symbol on said first display tube, the radius of said circular symbol being determined by said corrected vertical flight path position error signal,
(3) means for generating and displaying a radial line symbol on said first display tube, the angular position of said radial line symbol being determined by said radar antenna azimuth signal,
(4) means for generating and displaying a dot symbol on said radial line symbol, the position of said dot symbol along said radial line symbol being determined by said horizontal distance to touchdown signal,
(5) means for generating and displaying a vertical flight director line symbol on said first display tube, the horizontal position of said vertical line symbol being determined by the sum of (i) the roll component of said cyclic control signal, (ii) the roll component of said vertical gyro signal and (iii) successively, said lateral flight path position error signal and said lateral ground speed error signal, and
(6) means for generating and displaying a horizontal flight director line symbol on said first display tube, the vertical position of said horizontal line symbol being determined by the sum of (i) the pitch component of said cyclic control signal, (ii) the pitch component of said vertical gyro signal and (iii) successively, said first air speed error signal, said second air speed error signal, and said longitudinal ground speed error signal, first switch means to switch the third component of the control signal for said horizontal flight director line symbol from said first air speed error signal to said second air speed error signal at a first programmed position along the landing glide slope, and second switch means to switch the third component of the control signal for said horizontal flight director line symbol from said second air speed error signal to said longitudinal ground speed error signal at a second programmed position along the landing glide slope, and to switch the third component of the control signal for said vertical flight director line symbol from said lateral flight path position error signal to said lateral ground speed error signal at said second programmed position along said landing glide slope.

11. The aircraft navigational system airborne apparatus of claim 9 further including:
a vertical gyro sensor to provide a vertical gyro signal having a pitch component and a roll component,
a rate of climb sensor to provide a rate of climb signal,
an absolute altimeter sensor to provide an absolute altitude signal,
a vertical display including:
(1) a second display tube,
(2) means for generating and displaying a circular symbol on said second display tube, the vertical position of said circular symbol being determined by said vertical flight path position error signal and the horizontal position of said circular symbol being determined by said lateral flight path position error signal,
(3) means for generating and presenting a T symbol on said second display tube, the vertical bar of said T symbol being centered on the display, the horizontal bar of said T symbol being deflected below the X-axis of said display tube by a magnitude that is determined by said absolute altitude signal,
(4) means for generating and displaying an attitude symbol on said second display tube, the vertical position of said attitude symbol being determined by said pitch component of said vertical gyro signal and the angular position of said attitude symbol being determined by said roll component of said vertical gyro signal,
(5) means for generating and displaying a dot symbol on said second display tube, the vertical position of said dot symbol being determined by said rate of climb signal and the horizontal position of said dot symbol being determined by said selected heading reference error signal,
(6) means for generating moving dots on said horizontal bar of said T symbol, the rate of movement of said moving dots being determined by said longitudinal ground speed signal,
(7) means for generating moving dots on the vertical bar of said T symbol, the rate of movement of said moving dots being determined by said lateral ground speed signal.

References Cited
UNITED STATES PATENTS

| | | |
|---|---|---|
| 2,405,231 | 8/1946 | Newhouse. |
| 2,463,529 | 3/1949 | Ferrill _____ 343—108 X |
| 2,475,212 | 7/1949 | Wolff. |
| 2,845,623 | 7/1958 | Iddings _____ 343—108 X |
| 2,932,024 | 4/1960 | Saint Angelo _____ 343—108 |
| 3,005,185 | 10/1961 | Cumming et al. |
| 3,230,527 | 1/1966 | Wehde et al. _____ 343—108 X |

RODNEY D. BENNETT, *Primary Examiner.*

CHESTER L. JUSTUS, *Examiner.*

P. M. HINDERSTEIN, D. C. KAUFMAN,
*Assistant Examiners.*